United States Patent [19]

Clark

[11] Patent Number: 5,111,370

[45] Date of Patent: May 5, 1992

[54] DEVICE AND METHOD FOR CONVERTING A DOWN-LIGHT INTO AN UP-LIGHT

[76] Inventor: Walter B. Clark, 1910 Newell Rd., Palo Alto, Calif. 94303

[21] Appl. No.: 658,763

[22] Filed: Feb. 21, 1991

[51] Int. Cl.$^5$ .............................................. F21V 19/02
[52] U.S. Cl. .................................. 362/147; 362/220; 362/260; 362/221; 362/388; 439/236; 439/537; 52/28
[58] Field of Search ............... 362/145, 147, 148, 150, 362/217, 220, 221, 222, 225, 250, 285, 391, 368, 388, 260; 52/28; 439/531, 537, 236

[56] References Cited

U.S. PATENT DOCUMENTS

| | | | |
|---|---|---|---|
| 2,807,709 | 9/1957 | Guth | 362/148 |
| 2,953,626 | 9/1960 | Somes, Jr. | 362/150 |
| 4,109,305 | 8/1978 | Claussen et al. | 362/225 |
| 4,263,639 | 4/1981 | Schacht | 362/147 |
| 4,613,929 | 9/1986 | Totten | 362/150 |
| 4,674,016 | 6/1987 | Gallagher | 362/217 |
| 4,799,134 | 1/1989 | Pinch et al. | 362/217 |
| 4,866,584 | 9/1989 | Plewman | 362/225 |
| 4,928,209 | 5/1990 | Rodin | 362/217 |
| 4,965,875 | 10/1990 | Korte et al. | 362/217 |
| 5,032,959 | 7/1991 | Brass | 362/241 |

OTHER PUBLICATIONS

Inc., Hands On, Mar. 1990, p. 91.
Charles Linn, Shedding New Light On the Computerized Office, Facilities Design & Management, Jul. 1990.

*Primary Examiner*—Ira S. Lazarus
*Assistant Examiner*—D. M. Cox
*Attorney, Agent, or Firm*—Limbach & Limbach

[57] ABSTRACT

A device and method for converting a fluorescent down-light into an up-light or combined up-down-light involves suspending a luminaire body from a ceiling below a pre-existing down-light. Ballast lead extenders connect lamp holders in the luminaire body to the lamp holders in the pre-existing down-light. A reflective panel is inserted above the luminaire body serving the dual purposes of hiding the down-light and downwardly reflecting the light which emanantes from the luminaire body.

21 Claims, 7 Drawing Sheets

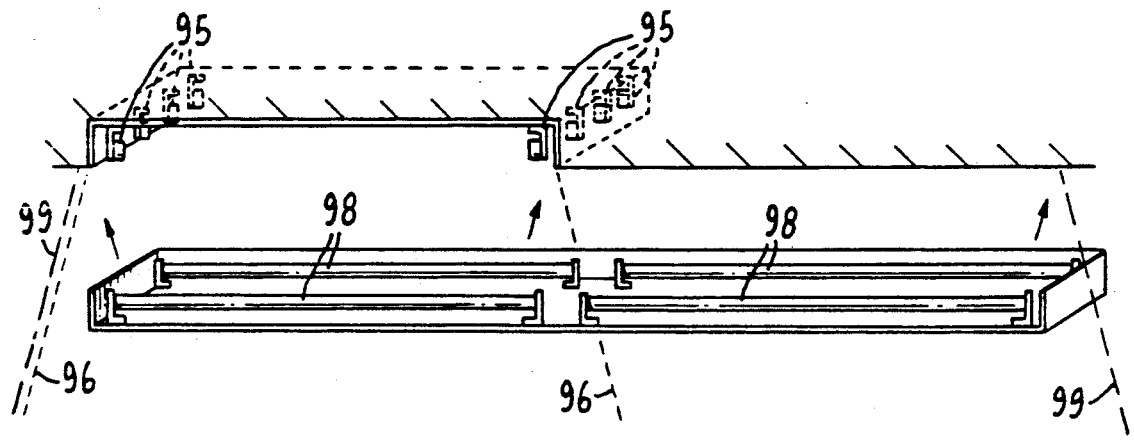
FIG. 9
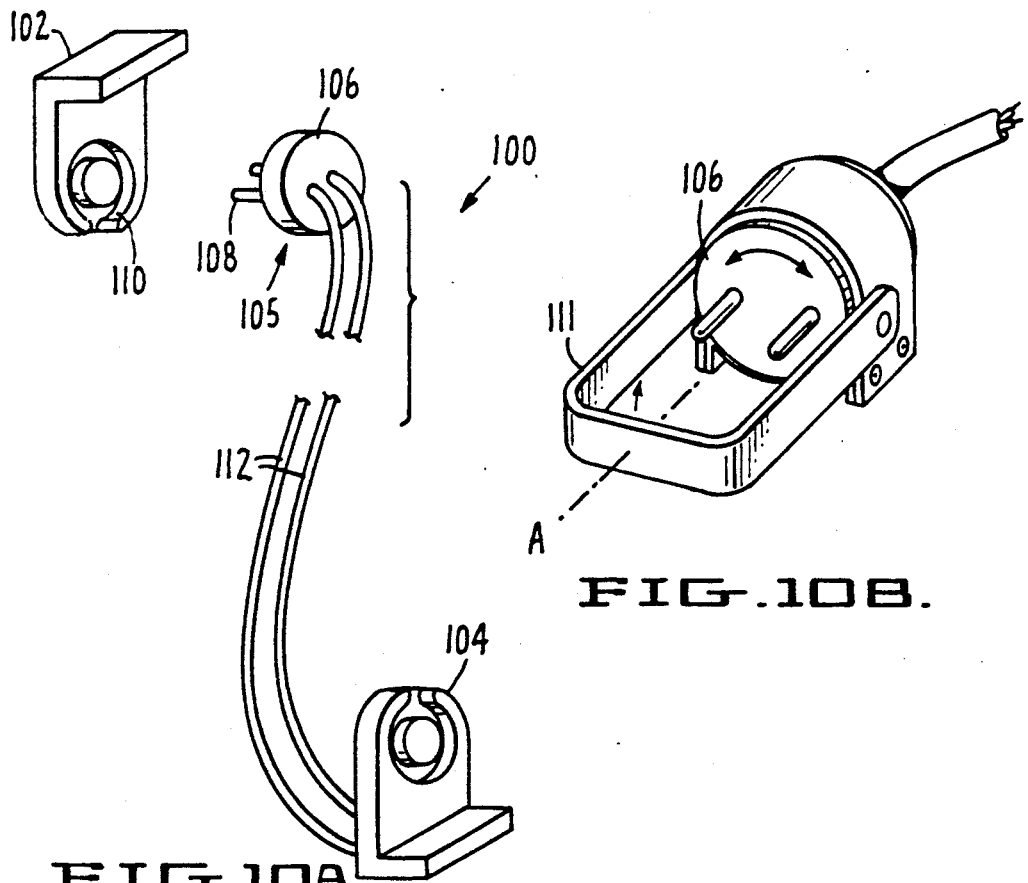
FIG. 10A.
FIG. 10B.

DEVICE AND METHOD FOR CONVERTING A DOWN-LIGHT INTO AN UP-LIGHT

FIELD OF THE INVENTION

The invention relates to lighting devices. In particular, the invention involves a device and method for converting an indoor fluorescent down-light into an up-light or up-down-light for the purpose of substantially eliminating harmful glare.

BACKGROUND OF THE INVENTION

In the past decade, largely due to the proliferation of computers in the work place, the need to better understand the effects of lighting systems on workers' health and the need to design superior lighting systems have become paramount objectives. With the advent of video display terminals ("VDT") in the work place, as shown in FIG. 1, the relationship between workers, their tasks, and their environments has been altered significantly due to the fact that traditional "white paper tasks" have been substituted by VDT-based tasks. Lighting systems which were adequate before the VDT, are no longer satisfactory.

Lighting problems are now recognized among corporate executives as well as office workers, as the most prevalent health hazard in the work place. "Office Environment Index" survey of 1,041 office workers and 150 top executives, Steelcase Inc., Grand Rapids, 1989. The American Society of Interior Designers found that 68% of employees complain about the light in their offices. A Silicon Valley study concluded that 79% of VDT users want better lighting.

Typical fluorescent lights in the work place fall into three general categories, which are illustrated in FIGS. 2A, 2B and 2C. Illustrative of the first category is fixture 12, as shown in FIG. 2A, which is a "direct light", also referred to as a "down-light". Down lights project light in a straight-line path from the lamp to the work area. It is usually possible for a worker to actually see the down-light lamp from the work area. Down-lights are the most common type of light used in the work place.

As shown in FIG. 2B, fixture 14 is an example of the second category of fluorescent lights, known as "indirect lights", also referred to as "up-lights". In contrast to down-lights, up-lights project light onto a diffusing reflective surface which then directs the light into the work area. Ideally, up-light lamp output is controlled to provide a widespread light distribution in an upward direction to provide an even luminance over the whole ceiling which in turn provides the lighting for the space below.

Fixture 16 of FIG. 2C shows the third category of fluorescent light, which is a hybrid of the first two categories, referred to as a "direct-indirect light" or "up-down-light".

Within each light category various adaptations and accessories have been designed for the purposes of producing uniform, glare-free, shadow-free lighting. For example, as shown in FIG. 3, parabolic louvers 18 have been designed to serve as miniature baffles in a down-light for the purpose of minimizing the amount of light which directly enters the workers eyes as low angle glare. FIG. 4 shows an adaptation for an up-light, involving a lens 20 for refracting light upwardly in a uniform manner. However, until recently there was no definitive evidence of which general type of lighting is healthier for the worker.

In 1989 and 1990 Hedge et al., of Cornell University conducted a large scale experiment in the Xerox Corporation offices in Webster, N.Y., for the purpose of comparing state of the art down-lighting to state of the art up-lighting. The main goal of the study was to determine which system was preferable from the worker's perspective. The criteria were complaint frequencies and effect on work function. The type of down-light used in the study was a 3-lamp, 18-cell 2'×4' parabolic light. The up-light used was a partially-lensed system designed for open offices.

The results of the Cornell study show an overwhelming preference for the up-lights. Daily complaints of tired eyes and eye focusing problems were twice as frequent among workers who used down-lights relative to those who used up-lights. Almost half of those who used down-lights ended up modifying their lights, either by disconnecting lamps within the fixture, disconnecting the whole fixture or putting up some form of paper baffle to shield the fixture. In contrast, there was only a single reported instance of a worker modifying an up-light. Of all the workers in the study, approximately 80% expressed a preference for up-lights. Up-lights were also preferred with respect to work space glare, VDT screen glare and office light level. The two lighting systems were also compared in terms of worker productivity. 20% of the down-light users reported losing more than 15 minutes of work time per day due to eye focusing problems. In comparison, only 2% of the up-light users reported loss of more than 15 minutes of work time per day.

The Cornell study has brought a problem of tremendous magnitude into clear focus. Due to the fact that, prior to the Cornell study the advantages of up-lights were not well documented or established, and the fact that down-lights are initially somewhat less expensive to install compared to up-lights, most work places today have been equipped with down-lights. The field of "work places" which have made the regrettable decision to install down-lights spans across all industries, all around the world. Now, in view of recent studies, many individuals and institutions will desire to replace existing down-lights with up-lights.

The problem is that prior to the present invention, the only way to convert a down light into an up-light is to completely remove the down-light fixture and replace it with an up-light fixture. Such a conversion requires major structural changes to the ceiling, special permits to comply with local building codes, and substantial rewiring which must be performed by a skilled electrician. Moreover, such a conversion completely wastes the old down-light creating a significant disposal problem. All of this adds up to an extreme expense which will be prohibitive for most down-light users.

Prior modification devices have been disclosed which involve relocating the fluorescent lamp of a down-light for the purpose of decreasing the number of lamps and accordingly decreasing the amount of energy required to power the light. For example, U.S. Pat. No. 4,799,134 ('134) discloses a "delamping" device having an electrical connector for repositioning the lamp, a reflector above the lamp for redirecting the light downward and an additional V-shaped reflector below the lamp for scattering the light outward. However, this delamping device merely modifies a down-light to operate with less lamps, while retaining its overall down-light configuration. A similar delamping device is disclosed in U.S. Pat. No. 4,928,209 ('209) which includes a plug and substitute socket for relocating the fluorescent lamp to a central position below a reflector. Similar to the '134 device, the '209 device merely delamps a down-light, while retaining the overall down-light configuration. These references involve solutions to different problems from those solved with the present invention. In essence, the references fail to teach how to convert a down-light into an up-light.

SUMMARY OF THE INVENTION

The objective of the present invention is to provide a method and device for converting a fluorescent down-light into an up-light with no modification to the pre-existing building structure, minimal waste, and minimal time and expense, while allowing maximal flexibility for providing various types of indirect lighting schemes.

These and other important objectives are accomplished with the device of the present invention which allows the conversion of a ceiling down-light into an up-light. The pre-existing down-light typically has at least one fluorescent lamp holder including two opposing female receptacles dimensioned to receive pins which extend from the ends of a fluorescent lamp. The modification device includes a luminaire body having a reflective lower wall and at least one lamp holder mounted between the lower wall and the ceiling. A hook and cable or some other similar means is used to suspend the luminaire body from the ceiling. A ballast lead extender electrically connects the down-light lamp holder to the luminaire body lamp holder. A reflective panel is provided for ceiling insertion serving the dual purposes of covering the down-light and providing a light scattering surface for downward reflection of the light emanating from the luminaire body.

The invention also involves methods of using the conversion device. In one method embodiment, an up-light is installed to functionally replace a pre-existing down-light by first, removing the existing down-light diffuser as if to prepare for relamping. The lamps are then removed from the down-light lamp holders, and set aside for later reinstallation. An up-light luminaire body is suspended from the ceiling so that the luminaire lamp holders are positioned between the luminaire lower wall and the ceiling. Next, the ballast lead extenders are plugged into the female receptacles of the down-light lamp holders. Finally, a reflective panel is installed above the up-light luminaire body and fluorescent lamps are installed into the up-light lamp holders.

Other embodiments of the present invention, based on the same basic structural features and methodologies set forth above, allow conversion of a pre-existing down-light into a hybrid up-down-light. This is accomplished by selecting a material for the luminaire body which is partially transmissive.

From the following detailed description, those having ordinary skill in the art will recognize that the claimed invention is intended to include numerous variations of the basic principals of the present invention which are set forth below.

BRIEF DESCRIPTION OF THE FIGURES

FIG. 9 is a side view of another embodiment of the present invention.

FIG. 10A is a partial perspective view of a ballast lead extender of an embodiment of the present invention.

FIG. 10B is a partial perspective view of a ballast lead extender of another embodiment of the present invention.

DETAILED DESCRIPTION OF THE PREFERRED EMBODIMENTS

The present invention provides an efficient means for converting a fluorescent down-light into an up-light. It is particularly useful for those who installed down-lights prior to understanding the substantial superiority of up-lights in terms of worker productivity and health factors. The invention basically comprises an up-light which is equipped to plug into a pre-existing down-light without any complicated rewiring or structural modification to the existing building.

Figure 1:
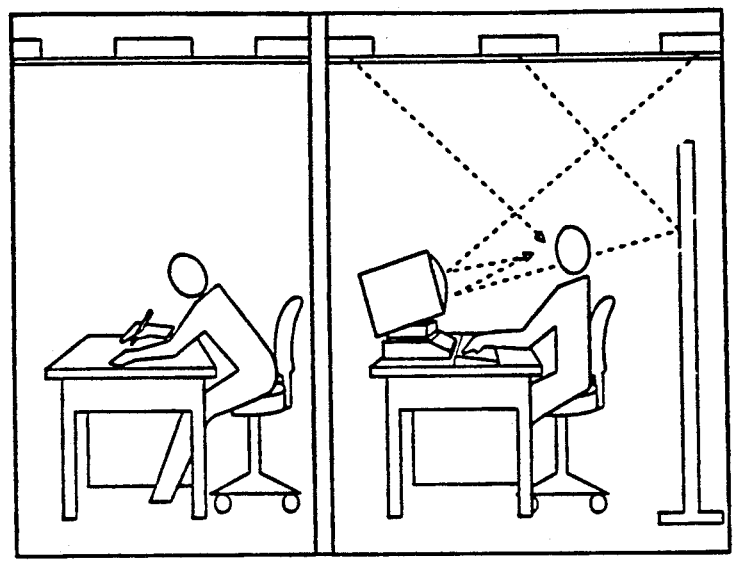
FIG. 1 is a schematic side view showing the difference in relationship between a down-light and a worker's eyes, depending on the worker's task.
Figure 2A:
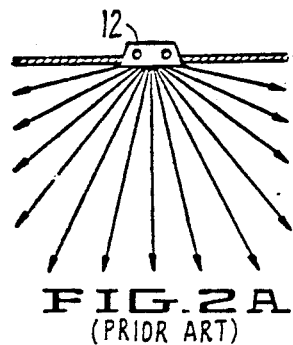
FIGS. 2A, 2B and 2C are side views of three general types of prior art fluorescent lights.
Figure 2B:
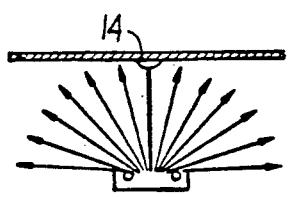
Figure 2C:
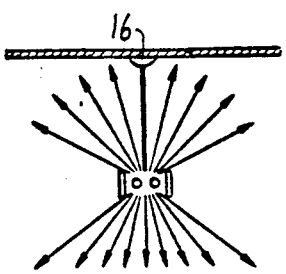
Figure 3:
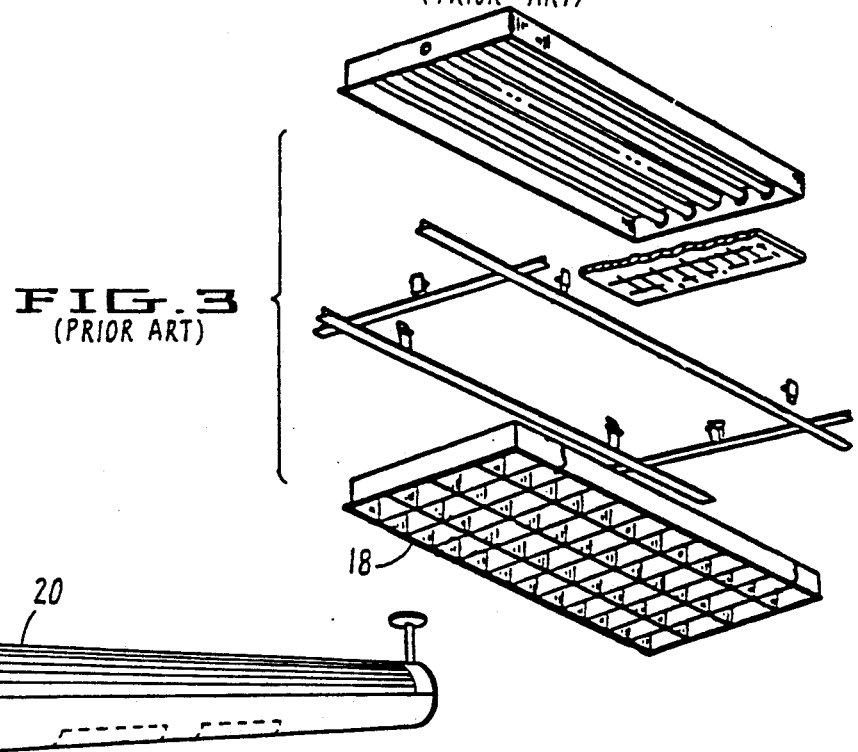
FIG. 3 is an exploded perspective view of a modified down-light having parabolic louvers.
Figure 4:
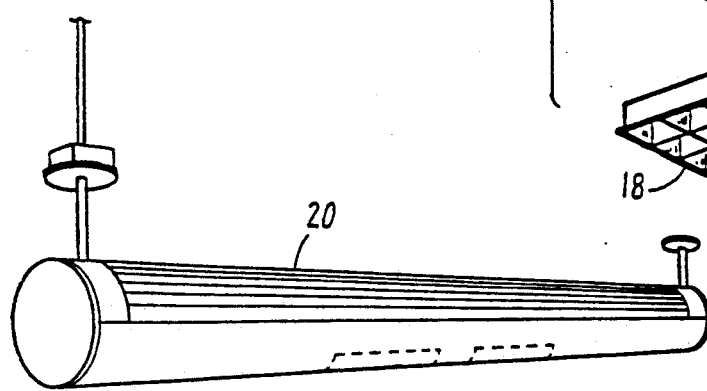
FIG. 4 is a perspective view of an up-light having a refractive lens.
Figure 5:
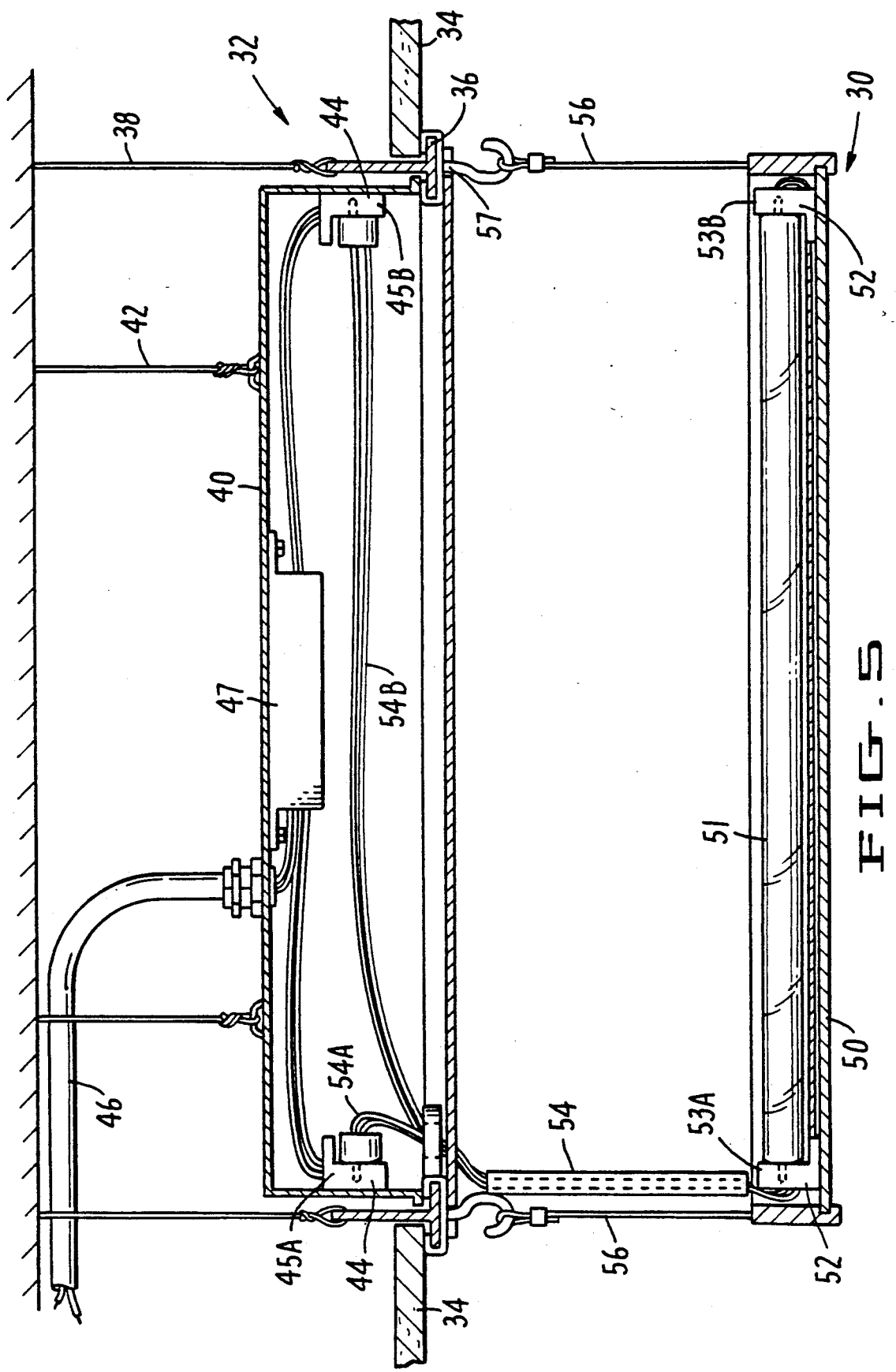
FIG. 5 is a side view of an embodiment of the present invention.

FIG. 5 illustrates how a modification device embodiment 30 of the present invention is integrated with a preexisting down-light 32 relative to a ceiling 34, which is structurally supported by a grid of T bar supports 36. The T bar supports 36 are supported by wires 38 which are attached to main structural elements of the building. The pre-existing down-light 32 includes a luminaire body 40 which may also be attached to the building structure via support cables 42. The luminaire body 40 has at least one lamp holder 44 which includes a set of two opposing female receptacles 45A and 45B. The receptacles 45 are dimensioned to receive the ends of a fluorescent lamp. Electricity is supplied to the down-light via an existing electrical conduit 46 which is connected to the down-light ballast 47. The ballast 47 converts the building power to the power needed to energize fluorescent lamps in the down-light.

The conversion embodiment of the present invention, as shown in FIG. 5, includes a luminaire body 50 having at least one lamp holder 52, including a set of two female receptacles 53A and 53B which are dimensioned to received the ends of a fluorescent lamp 51. The lamp holder 52 is electrically connected to the down-light holder 44, by a ballast lead extender 54. The end of the ballast lead extender 54 which is distal from the up-light luminaire body 50, splits into two portions 54A and 54B for plugging into the opposing terminals of the down-light lamp holder 44.

The up-light embodiment in FIG. 5 also includes a means 56 for suspending the luminaire body 50 from the ceiling 34. In this embodiment the suspending means 56 includes a wire connected to a clasp 57 for gripping the T bar support 36. A reflective panel 58 is positioned between the T bar support 36 so as to cover the down-light 32, and to provide a light scattering surface to downwardly reflect light which emanates from the lamp 51 in the luminaire body 50.

Figure 6A:
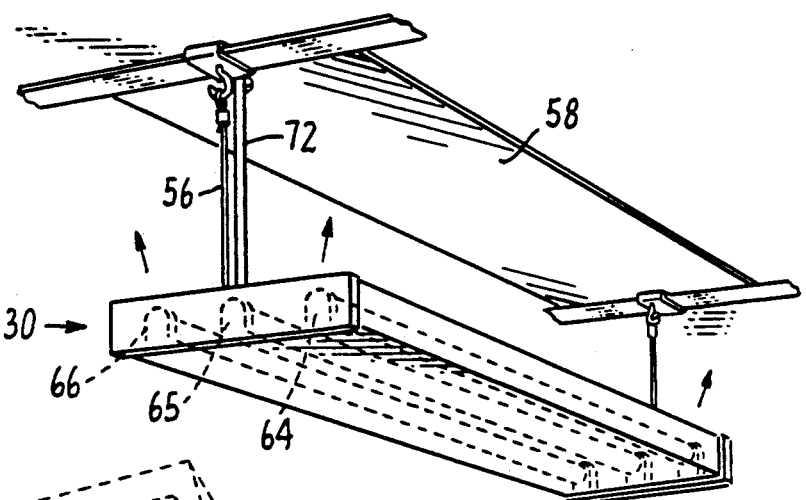
FIG. 6A is a perspective view of a multiple lamp embodiment of the present invention.

FIG. 6A illustrates an embodiment of the present invention having multiple lamp holders. The general configuration of the up-light 30 is the same as shown in FIG. 5. However, the luminaire body 50 has three lamp holders 64, 65 and 66. As more specifically illustrated in FIG. 6B, each lamp holder has a separate ballast lead extender which distally separates into two separate portions for plugging into opposing terminals of down-light lamp holders. Accordingly, lamp holder 64 connects to ballast lead extender distal end portions 64A and 64B. Lamp holder 65 connects to ballast lead extender distal end portions 65A and 65B. Lamp holder 66 connects to ballast lead extender distal end portions 66A and 66B. Each of the ballast lead extenders are bound together into a bundle, preferably protected by an outer sleeve 72, as they pass from the up-light to the down-light. This feature provides protection for the electrical conduits while minimizing the aesthetic detraction of having multiple wires visually exposed.

Figure 6B:
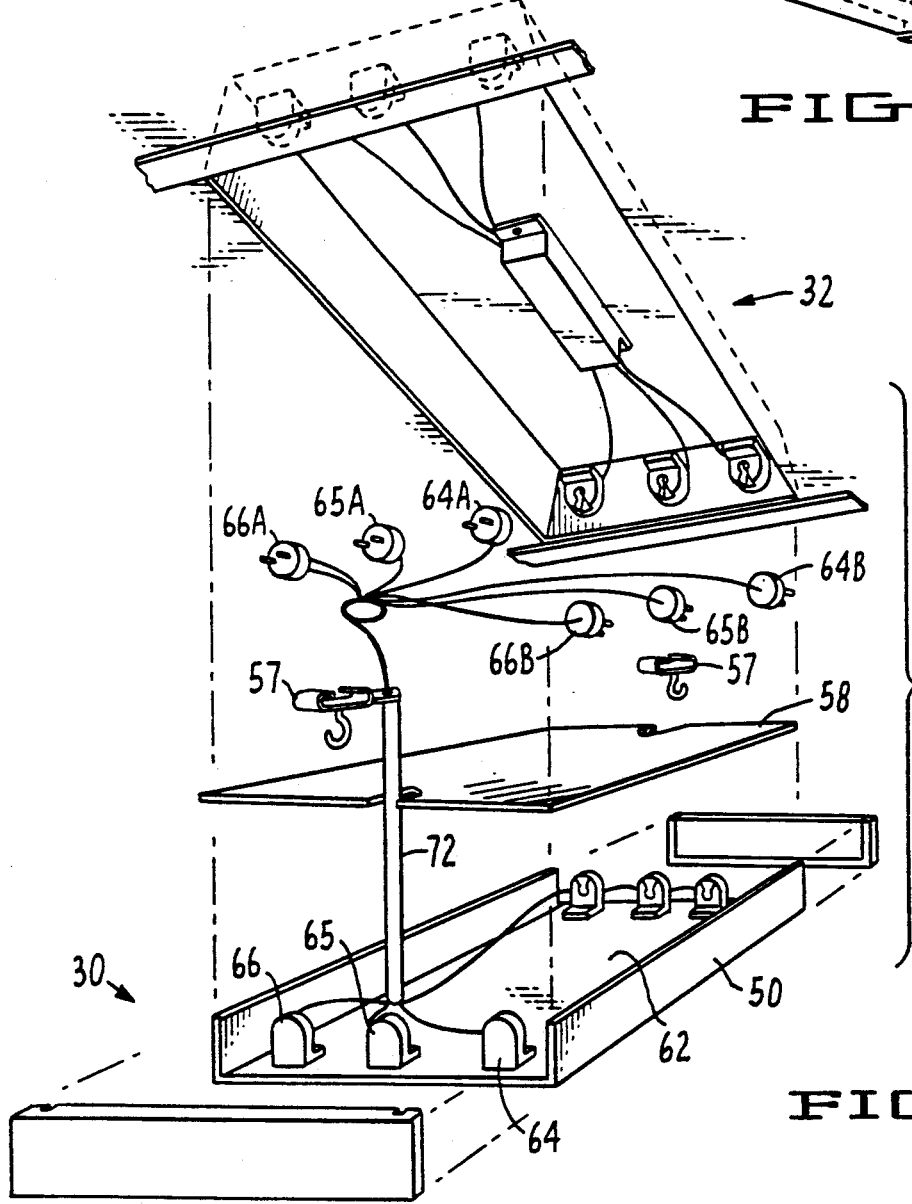
FIG. 6B is an exploded perspective view of the multiple lamp embodiment shown in FIG. 6A.

FIGS. 6A and 6B also show the reflective lower wall 62 of the luminaire body 50. It is the position of such a wall below the lamp holders which gives an up-light its indirect lighting character. The luminaire body lower wall can be provided in various shapes, and can be made of various types of materials which vary in terms of their transmissive characteristics. If it is desirable to produce a complete up-light the luminaire body lower wall should be completely opaque so as to maximumly reflect upward the light which is produced from the fluorescent lamps. Alternatively, a hybrid up-down-light can be produced by making the luminaire body lower wall partially transmissive.

Figure 7:
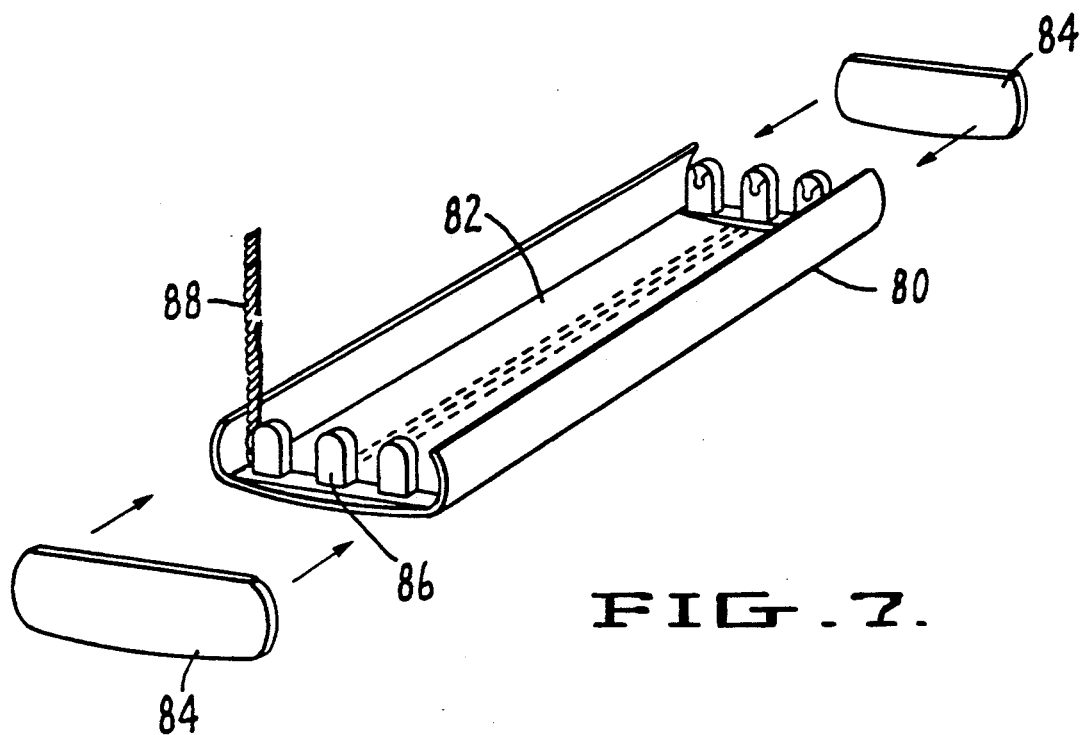
FIG. 7 is a partial exploded view of another embodiment of the present invention.

FIG. 7 illustrates another embodiment of the present invention, in which the luminaire body 80 has a curved shape. The lower wall 82 is also curved. End caps 84 are designed to fit onto opposing ends of the luminaire body 80. Lamp holders 86 are connected to a preexisting down-light via ballast lead extenders which pass through a protective sleeve 88.

Figure 8:
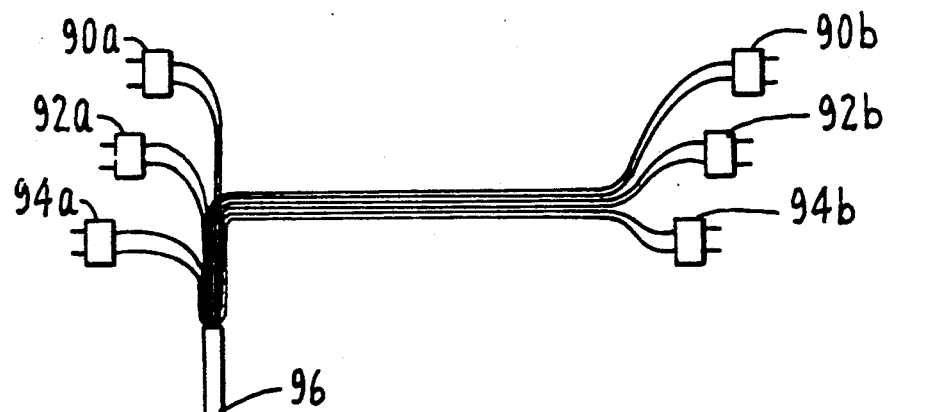
FIG. 8 is a schematic diagram illustrating a ballast lead extender configuration of an embodiment of the present invention.
Figure 8:
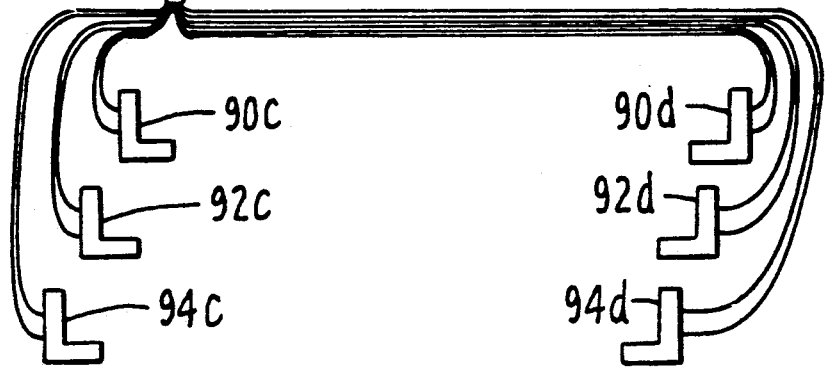

FIG. 8 illustrates a ballast lead extender configuration for connecting a down-light having three lamp holders to an up-light having three lamp holders. Each lamp holder in the down-light has two terminals corresponding to two terminals in one of the up-light lamp holders. The ballast lead extender configuration in FIG. 8 provides the electrical connection between corresponding lamp holders in the two lights. Down-light ballast lead extender end portions 90A and 90B are electrically connected to lamp holder terminals 90C and 90D in the up-light. Ballast lead extender end portions 92A and 92B are electrically connected to lamp holder terminals 92C and 92D in the up-light. Ballast lead extender end portion 94A and 94B in the down-light are electrically connected to lamp holder terminals 94C and 94D in the up-light.

An advantageous feature in one embodiment of the present invention employs color coding between the various ballast lead extender end portions in order to simplify the process of implementing the up-light conversion device.

In FIG. 8 the ballast lead extender configuration provides a one to one correspondence between the number of lamp holders in the down-light relative to the up-light. However, it is also possible in the present invention to decrease the number of lamp holders in the up-light relative to the down-light allowing delamping for energy conservation.

It is also possible to vary the lamp configuration in the up-light relative to the down-light. In the embodiment illustrated in FIG. 9, four down-light lamp holders 95 are arranged in parallel to provide light over a work area which is approximately defined by the dashed lines 96. The down-light is converted into an up-light 97 which has four lamp holders 98 arranged into two sets, each set having two lamp holders arranged in series as illustrated. This extended up-light configuration allows the light to be distributed over a larger work area, approximately defined by the dotted lines 99.

FIG. 10A shows the elements of a ballast lead extender 100 for electrically connecting a down-light lamp holder terminal 102 to an up-light lamp holder terminal 104. The ballast lead extender 100 includes a connector 105 having a plug 106 located distally from the up-light lamp holder 104. The plug 106 has two male pins 108, which are positioned ½ inch apart from each other, and are dimensioned to fit into female holes 110 of the down-light lamp holder terminal 102.

FIG. 10B shows the ballast lead extender plug 106 which is further equipped with a retention cage 111. The retention cage 111 is rotatably attached to the plug 106 so that it can be easily latched over the back of a down-light lamp holder receptacle. The retention cage is attached to the plug 106 in such a way that the plug can be rotated around axis A while the cage 111 is latched over the lamp holder receptacle.

Figure 11A:
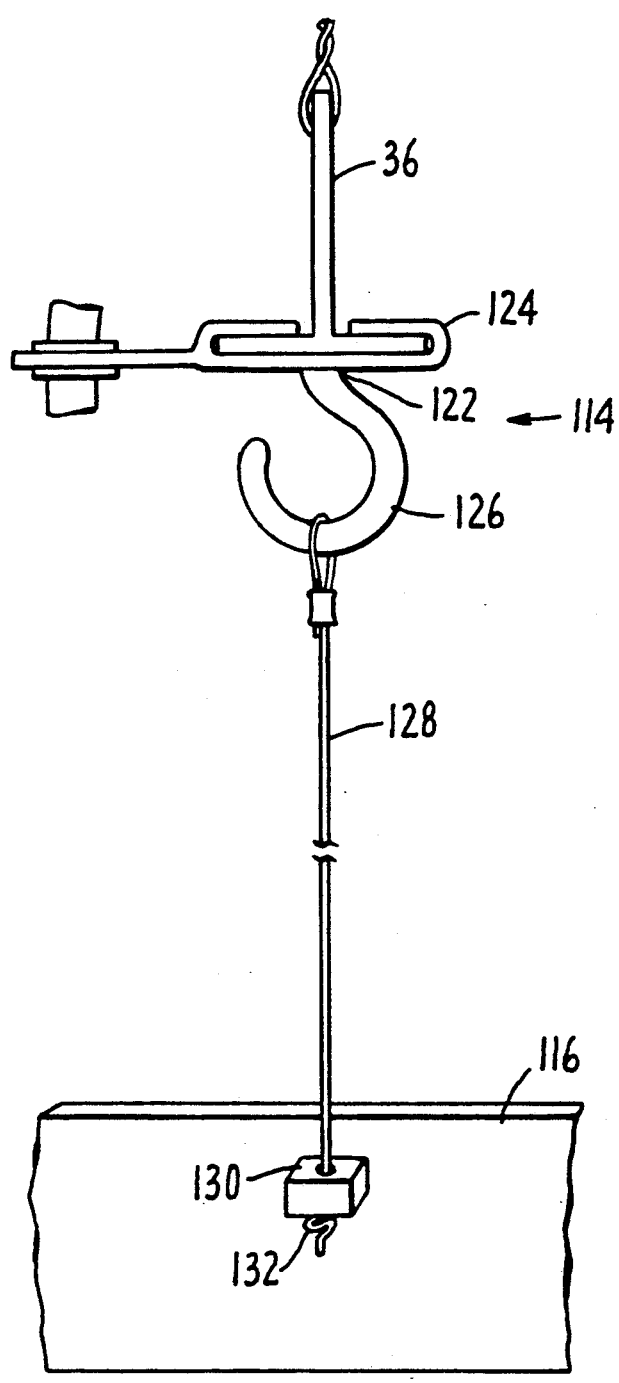
FIG. 11A is a partial side view illustrating a support means of an embodiment of the present invention.

FIG. 11A shows the elements of a suspending means 114, in one embodiment of the present invention, for supporting an end plate 116 of an up-light luminaire body. The suspending means 114 includes a clip 122 having a clasp portion 124 and a hook portion 126. The clasp portion 124 of the clip is dimensioned to grip the T bar support 36. The hook portion 126 of the clip 122 then extends downward and is connected to the support cable 128. The end of the support cable 128 which is proximal to the end plate of the up-light luminaire body, has a crimp 132. A bracket 130 is mounted on a side of the up-light luminaire body end plate 116. The bracket 130 has a hole which has a smaller diameter than the crimp 132 of the support cable, so that the end of the support cable 128 can be securely attached to the luminaire body of the up-light. For the embodiment shown in FIG. 10, it is necessary to provide at least one support cable for each end of the up-light luminaire body. However, it is sometimes preferable to provide additional support cables in order to further stabilize the up-light.

Figure 11B:
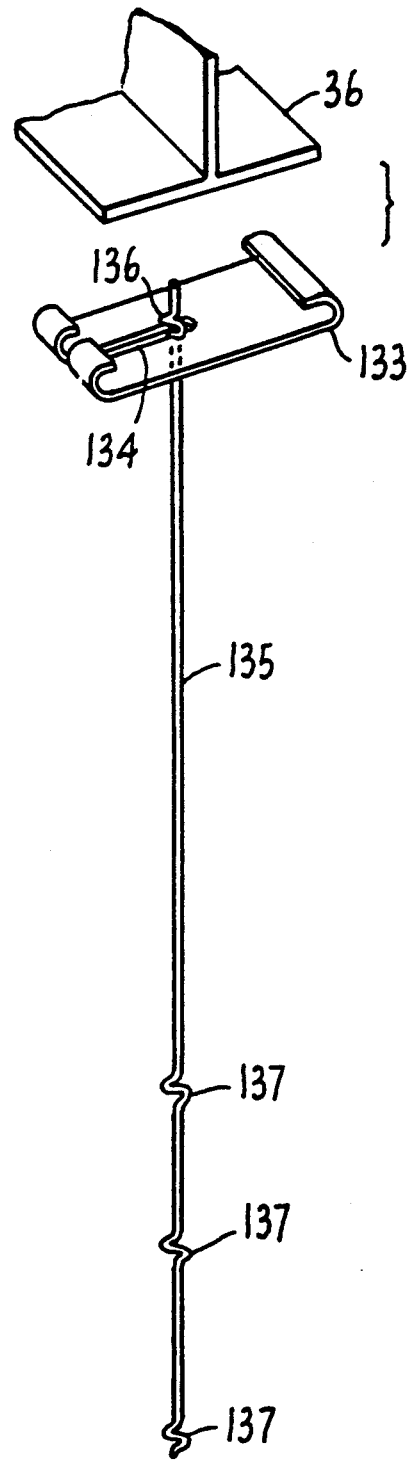
FIG. 11B is a partial side view illustrating a support means of another embodiment of the present invention.

Another suspending means is shown in FIG. 11B. A C-shaped clasp 133 is dimensioned to grip the T-bar support 36. The clasp 133 has a slot 134 for receiving a support wire 135. The wire has a crimp 136 located near a first end of the wire. The crimp 136 has a larger diameter than the width of the clasp slot 134, so that the first end of the wire can be easily attached to the clasp which is secured to the T-bar support. The second end of the wire 135 has a plurality of crimps 137 for attachment to the luminaire body. The plurality of crimps 137 allow adjustment of the suspension height of the new up-light.

Figure 12A:
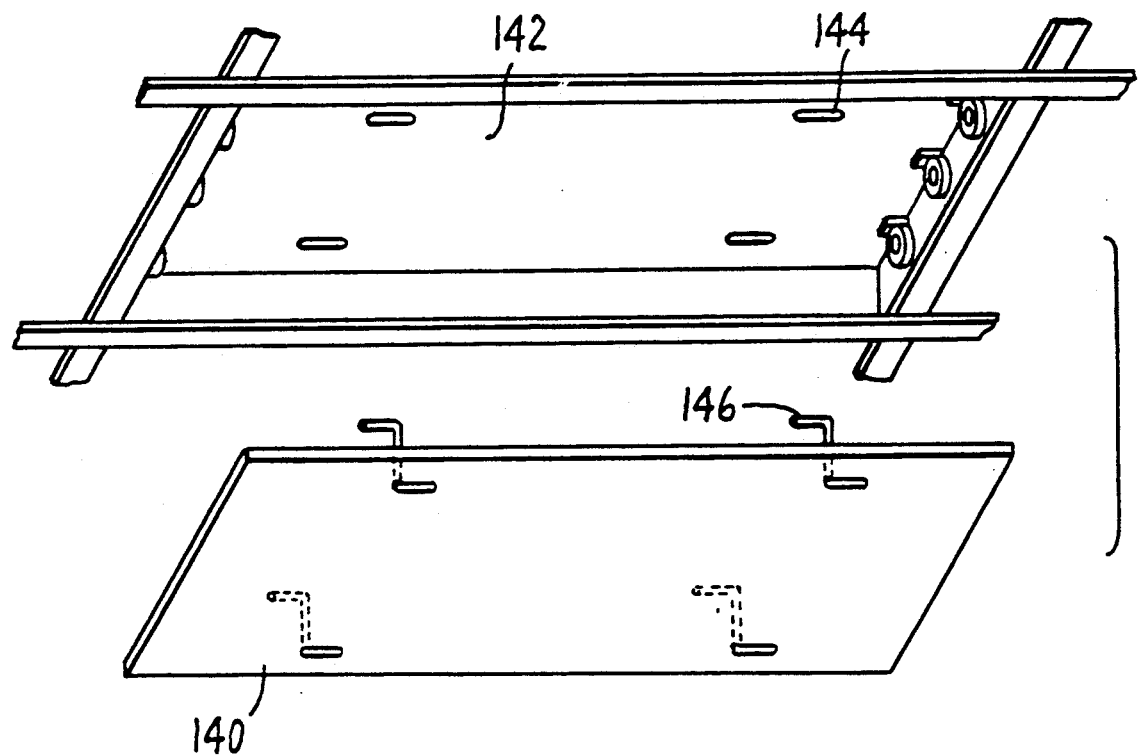
FIG. 12A is a perspective view of a ceiling replacement panel of an embodiment of the present invention.

FIG. 12A shows a reflective panel 140 to be positioned above the up-light for the primary purpose of downwardly reflecting light which emanates from the lamps in the luminaire body up-light. In this embodiment, the panel is dimensioned to fit between preexisting T bar supports, at ceiling level, so as to cover the preexisting down-light 142. The down-light 142 has holes or slots 144 which were previously used to retain an original diffuser system which has been removed. The panel 140 has clips 146 which are designed to fit into the holes 144 of the down-light 142.

Figure 12B:
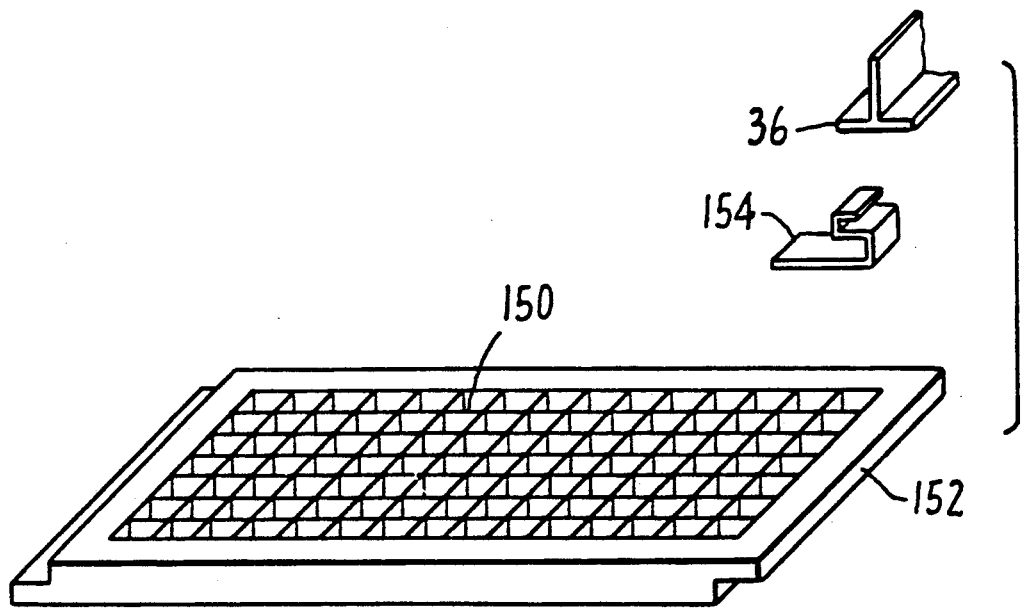
FIG. 12B is a perspective view of a baffle assembly of an embodiment of the present invention.

Alternately, a baffle assembly 150, as shown in FIG. 12B, preferably having $\frac{1}{2}'' \times \frac{1}{2}''$ cells, can be positioned between the luminaire body and the pre-existing down-light reflector. In this embodiment, the light which emanates from the up-light is reflected downward from the down-light reflector, while the baffling assembly 150 minimizes low angle glare. The baffle assembly 150 has an edge 152 which fits into an S-shaped spring clip 154. The spring clip allows attachment of the baffle assembly 150 to the T-bar support 36.

The numerous device components described above, provide methods for converting a down-light into an up-light or up-down-light which are advantageous over the prior art.

In one method embodiment, an up-light is installed to functionally replace a pre-existing down-light by first, removing the existing down-light diffuser as if to prepare for relamping. The diffuser is set aside for long term storage. The lamps are then removed from the down-light lamp holders, and set aside for later reinstallation. In most instances, it will be possible to use the same lamps in the new up-light. If the new up-light requires lamps of different specifications, then the lamps which are removed from the down-light must be stored for future use. The up-light installation is initiated by suspending the up-light luminaire body from the ceiling so that the luminaire lamp holders are positioned between the luminaire lower wall and the ceiling. Next, the ballast lead extenders are plugged into the female receptacles of the down-light lamp holders. This step will usually include latching the retention cages of the extender plugs over the lamp holder terminals, so that the electrical plugs are securely attached to the down-light. A reflective means is installed above the up-light luminaire body. As discussed above, the reflective means may be a planar panel or it may be a baffling assembly which allows light from the up-light to be reflected off the existing down-light reflector. Finally, fluorescent lamps are installed into the up-light lamp holders, completing the down-light to up-light conversion.

While the preferred embodiments have been described in detail above, other changes and modifications which are obvious to those skilled in the art, are intended to be included within the scope of the following claims.

I claim:

1. A device for converting a down-light mounted in a ceiling into an up-light, the down-light having at least one fluorescent lamp holder including two opposing female receptacles for receiving fluorescent lamp end pins, comprising:

a luminaire body having a reflective lower wall and at least one lamp holder mounted between the lower wall and the ceiling;

means for suspending the luminaire body from the ceiling; and a ballast lead extender electrically connecting the down-light lamp holder to the luminaire body lamp holder.

2. The device of claim 1, further comprising:

means for downwardly reflecting light which emanates from within the luminaire body.

3. The device of claim 2 wherein the reflecting means comprises a panel dimensioned to cover the down-light and to be substantially contiguous with the ceiling.

4. The device of claim 2 wherein the reflecting means comprises a baffle assembly, the down light having a reflector, the baffle assembly being positioned above the luminaire lamp holder and below the down-light reflector, so that light emanating from around the luminaire body is reflected downward off the down-light reflector and low angle glare is substantially controlled.

5. The device of claim 1 wherein the ballast lead extender has at least two male connector plugs located remotely from the luminaire body and dimensioned to fit into the down-light lamp holder receptacles.

6. The device of claim 5 wherein each extender connector plug has a retention cage pivotally connected to the plug, for latching over the down-light lamp holder receptacle.

7. The device of claim 5 wherein the luminaire body has a plurality of lamp holders, a separate ballast lead extender being provided for each luminaire lamp holder, each ballast lead extender being connected to a different down-light lamp holder.

8. The device of claim 7 further comprising a protective sleeve, each of the ballast lead extenders passing though the sleeve so that the extenders are bound together and protected.

9. The device of claim 8 wherein the ballast lead extender plugs are color coordinated so that corresponding pairs are properly arranged.

10. The device of claim 1 wherein the ceiling comprises an array of panels mounted between T-bar supports, the suspending means including clips and support cables, each clip having a C-shaped portion for gripping the T-bar support, each support cable having first and second ends, the support cable first end being attached to the clip and the support cable second end being attached to the luminaire body.

11. The device of claim 1 wherein the lower wall of the luminaire body is partially transmissive.

12. The device of claim 1 wherein the luminaire lower wall is substantially non-transmissive.

13. The device of claim 1 wherein the luminaire body is suspended directly below the down-light.

14. The device of claim 1 wherein the luminaire body is suspended below a portion of the ceiling other than where the down-light is located.

15. The device of claim 1 wherein the number of lamp holders in the luminaire body is equivalent to the number of lamp holders in the down-light.

16. The device of claim 7 wherein the luminaire body is longer than the down-light and at least two of the luminaire body lamp holders are arranged in series, so that light is distributed over a larger area.

17. The device of claim 1 wherein the number of lamp holders in the luminaire body is less than the number of lamp holders in the down-light.

18. A device for converting a down-light mounted in a ceiling into an up-light, the down-light having a plurality of fluorescent lamp holders, each lamp holder including two opposing female receptacles for receiving fluorescent lamp end pins, comprising:
- a luminaire body having a reflective lower wall and a plurality of lamp holders mounted between the lower wall and the ceiling;
- means for suspending the luminaire body from the ceiling;
- a plurality of ballast lead extenders, each extender electrically connecting one of the down-light lamp holders to one of the luminaire body lamp holders, the extender having at least two male connector plugs located remotely from the luminaire body and dimensioned to fit into the down-light lamp holder receptacles; and
- a reflective panel dimensioned to cover the down-light and to be substantially contiguous with the ceiling.

19. A method for converting a fluorescent down-light mounted in a ceiling into an up-light, comprising the steps of:
- providing a device for converting a ceiling down-light into an up-light, the down-light having at least one fluorescent lamp holder including two opposing female receptacles for receiving fluorescent lamp end pins, including a luminaire body having a reflective lower wall and at least one lamp holder, means for suspending the luminaire body from the ceiling; a ballast lead extender electrically connecting the down-light lamp holder to the up-light lamp holder, and a reflective panel body;
- suspending the luminaire body from the ceiling so that the luminaire lamp holder is positioned between the luminaire lower wall and the ceiling; and
- plugging the device extender into the female receptacles of the down-light lamp holder.

20. The method of claim 19, further comprising the step of:
- installing the reflective panel above the luminaire lamp holder so that light which emanates from within the luminaire body is reflected substantially downward.

21. The method of claim 19, further comprising the step of:
- installing a baffling assembly above the luminaire lamp holder, wherein the down-light has a reflector, the baffling assembly being positioned below the down-light reflector, so the light from the up-light is reflected downward off of the down-light reflector and the baffling minimizes low angle glare.

* * * * *